United States Patent
He

(10) Patent No.: US 11,317,704 B2
(45) Date of Patent: May 3, 2022

(54) INTEGRALLY-FORMED FLEXIBLE RUBBER APPLICATOR STICK

(71) Applicant: Huanghua Kangtian Medical Equipment Co., Ltd., Huanghua (CN)

(72) Inventor: Qingxuan He, Huanghua (CN)

(73) Assignee: Huanghua Kangtian Medical Equipment Co., Ltd., Huanghua (CN)

( * ) Notice: Subject to any disclaimer, the term of this patent is extended or adjusted under 35 U.S.C. 154(b) by 245 days.

(21) Appl. No.: 16/590,552

(22) Filed: Oct. 2, 2019

(65) Prior Publication Data
US 2021/0100345 A1 Apr. 8, 2021

(51) Int. Cl.
*A46B 5/00* (2006.01)
*A46B 1/00* (2006.01)
*A46B 9/02* (2006.01)
*A61C 3/00* (2006.01)

(52) U.S. Cl.
CPC ............. *A46B 5/0066* (2013.01); *A46B 1/00* (2013.01); *A61C 3/005* (2013.01); *A46B 9/02* (2013.01); *A46B 2200/20* (2013.01)

(58) Field of Classification Search
CPC ......... A46B 9/06; A46B 9/005; A46B 13/001; A46B 5/0066; A46B 5/0062; A46B 1/00; A61C 3/005; A61C 3/22
USPC ................................................. 15/186–188
See application file for complete search history.

(56) References Cited

U.S. PATENT DOCUMENTS

| | | | |
|---|---|---|---|
| 1,379,922 A * | 5/1921 | Isensee | B43L 19/04 15/105.51 |
| 1,793,307 A * | 2/1931 | Dolan | A47K 11/10 15/188 |
| 6,049,934 A * | 4/2000 | Discko | A46B 5/00 15/105 |
| 6,067,684 A * | 5/2000 | Kweon | A46B 7/04 15/167.1 |
| 6,754,930 B1 * | 6/2004 | Tsaur | A46B 5/0016 15/118 |
| 8,584,301 B2 * | 11/2013 | Maissami | A46B 1/00 15/167.1 |
| 9,339,359 B2 * | 5/2016 | Fritze | A61C 5/62 |

FOREIGN PATENT DOCUMENTS

CA 3022017 A1 * 11/2017 ............. A61C 15/00

* cited by examiner

*Primary Examiner* — Laura C Guidotti
(74) *Attorney, Agent, or Firm* — Blank Rome LLP

(57) ABSTRACT

The present invention discloses an integrally-formed flexible rubber applicator stick, and relates to the technical field of applicator sticks. The integrally-formed flexible rubber applicator stick includes a stick body that is connected to a soft connection region at one end thereof and connected to a handle at the other end thereof; a bristle head is mounted at an end of the soft connection region, and has multiple soft rubber bristles distributed thereon; an annular discarding groove is set up between the handle and the stick body; and an anti-slip thread is set up on the end of the stick body that is adjacent to the soft connection region. The integrally-formed flexible applicator stick provided by the present invention makes the production process simple and is not prone to losing bristles during use.

3 Claims, 3 Drawing Sheets

INTEGRALLY-FORMED FLEXIBLE RUBBER APPLICATOR STICK

FIELD OF USE

The present invention relates to the technical field of applicator sticks, in particular to an integrally-formed flexible rubber applicator stick.

BACKGROUND OF THE INVENTION

With the diversification of people's diets and the effects of their living habits, many dental health problems are presented in front of people and are distributed at all ages. The progressively-increasing dental treatments, such as dental restorations, root canal treatments, fluoride protection, tooth whitening, etc., alleviate the pain of patients with dental problems and regain their confidence. During the treatment of teeth, it is often necessary to apply related drugs, such as an acid-etching agent, a luting agent, a fluor protector, a hemostatic agent, a pit and fissure sealant, etc. This requires a tool that can not only apply a drug into a narrow space of the afflicted part, but also save the drug and be safe and hygienic.

In oral therapy, there are many types of tools for applying drugs, such as a disinfecting brush, an applicator stick, a hairbrush, etc., and the tools are mostly produced by production processes of electrostatic flocking or metal-sheet fixation. Both the two production processes are secondary processing. The electrostatic flocking is a process in which a stick body is first produced, and then the stick body is subjected to viscose flocking; and the metal-sheet fixation is a process in which the bristles are fixed with a metal sheet in a hole on the head of the stick body. Both the two production processes are not only cumbersome, but also prone to causing product contamination during the process of flocking turnover. Secondly, the environmental safety of the rubber is very low, and when used by a doctor, the tool will have a bristle-losing phenomenon which will affect the application effect of the drug.

SUMMARY OF THE INVENTION

An objective of the present invention is to provide an integrally-formed flexible applicator stick, which solves the aforementioned problems existed in the prior art, makes the production process simple and is not prone to losing bristles during use.

To achieve the above purpose, the present invention provides the following solution.

The present invention provides an integrally-formed flexible rubber applicator stick, which includes a stick body that is connected to a soft connection region at one end thereof and connected to a handle at the other end thereof; a bristle head is mounted at an end of the soft connection region, and has multiple soft rubber bristles distributed thereon; an annular discarding groove is set up between the handle and the stick body; and an anti-slip thread is set up on the end of the stick body that is adjacent to the soft connection region.

Optionally, the soft connection region includes an integrally-formed columnar portion and a tapered portion, where the columnar portion is connected to one end of the stick body, and an end of the tapered portion is connected to the bristle head; and the diameter of the columnar portion is smaller than that of the stick body.

Optionally, the end of the tapered portion of the soft connection region is covered with the bristle head, and the periphery of the bristle head is covered with the flexible rubber bristles.

Optionally, the lengths of the multiple flexible rubber bristles are different, and the multiple flexible rubber bristles of different lengths are evenly distributed on the outer surface of the bristle head.

Optionally, the bristle head is made of a silicone material.

Optionally, the anti-slip thread is an annular external thread structure.

Optionally, the stick body is a cylindrical structure.

Compared with the prior art, the present invention achieves the following technical effects:

The present invention adopts an injection molding production process in which a double injection mold structure and feed drums independent from each other are adopted. During the injection molding, the stick body is first produced from a PP material, then the mold is inverted to conduct feeding from a silicone cartridge, and the injection molding of the silicone bristle head is completed at the head of the stick body. Such a production process does not require secondary processing, which not only saves time, but also increases the production efficiency, and the key is that the pollution caused by the secondary processing is eliminated. The product dimension, the bristle head size, the density, and the amount of bristles of the bristle head of the injection-molded applicator stick are not changed as compared with those of the electrostatic flocking and flocking by other processes.

The material adopted for the stick body of the present invention is PP, which is poisonless, tasteless and of good strength. The portion of the head for sticking the drug is made of a silicone material, such that the portion is soft, provides the patient with a comfortable sense without any foreign body sensation when applied on an afflicted part, and can extend to a small site of the afflicted part to enable the drug to be applied more thoroughly; the portion is corrosion-resistant, can stick to various medicines required for tooth treatment, will not lose bristles, and is safe and hygienic; the silicone bristle head has a large density, an uniform amount and density of the bristles, a good adsorbability, sticks the drug without any residue, and can stick an appropriate dosage as desired and thus does not result in waste.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

where, 1 represents a stick body, 2 represents a soft connection region, 3 represents a handle, 4 represents a bristle head, 41 represents soft rubber bristles, 5 represents a discarding groove, and 6 represents an anti-slip thread.

DETAILED DESCRIPTION OF THE ILLUSTRATED EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide an integrally-formed flexible applicator stick, which solves the aforementioned problems existed in the prior art, makes the production process simple and is not prone to losing bristles during use.

To make the foregoing objective, features, and advantages of the present invention clearer and more comprehensible, the present invention is further described in detail below with reference to the accompanying drawings and specific embodiments.

Figure 1:
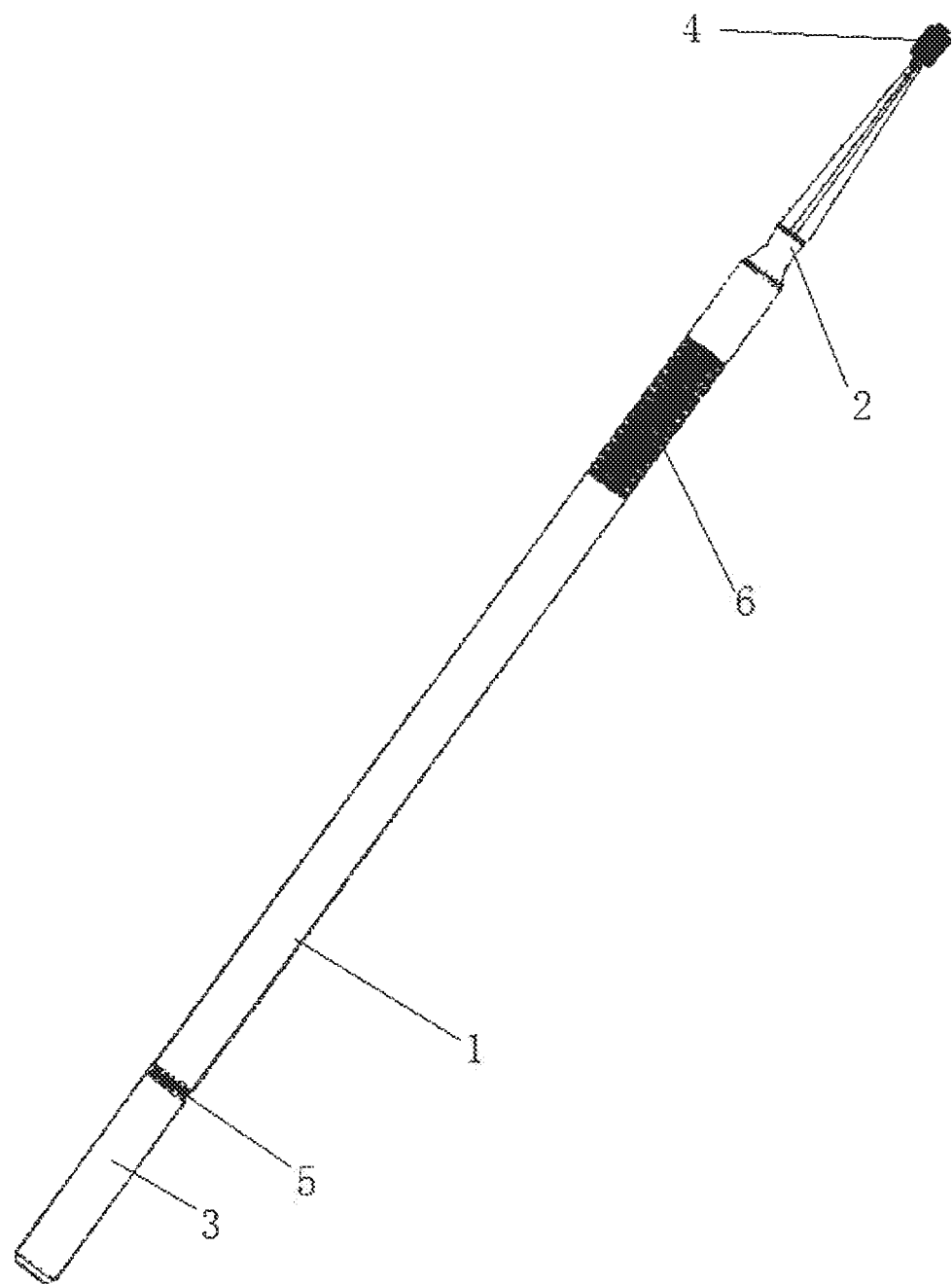
FIG. 1 is a schematic view showing the overall structure of the present invention.
Figure 2:
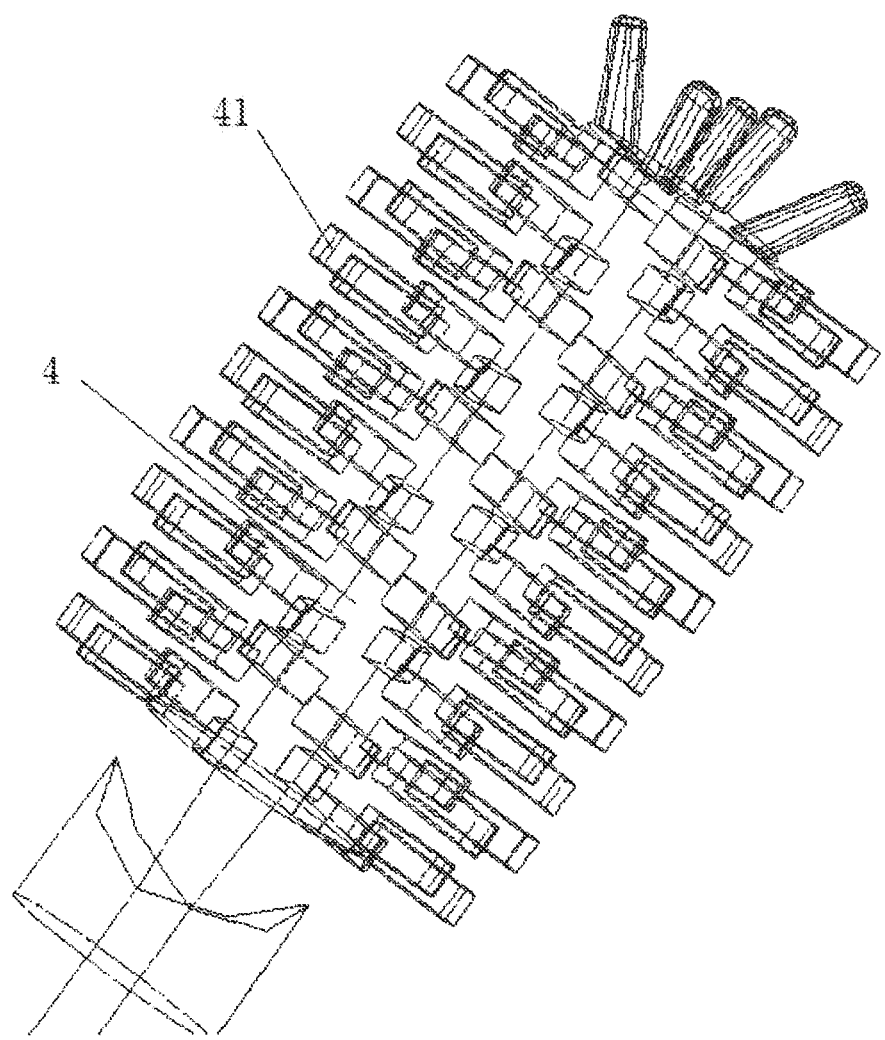
FIG. 2 is a schematic view showing the structure of the bristle head of the present invention.
Figure 3:
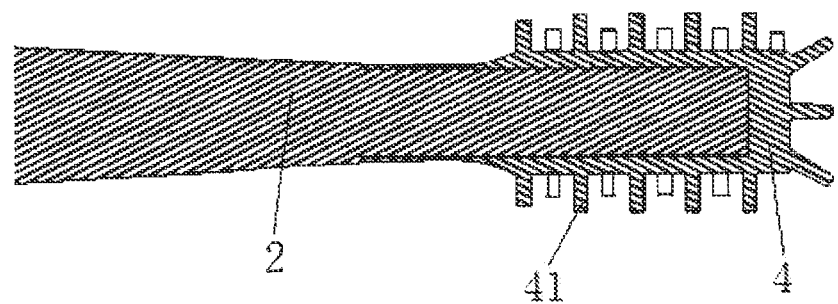
FIG. 3 is a schematic cross-sectional structural view of the bristle head of the present invention.

The present invention provides an integrally-formed flexible rubber applicator stick shown in FIGS. 1-3, which includes a stick body 1 that is connected to a soft connection region 2 at one end thereof and connected to a handle 3 at the other end thereof; a bristle head 4 is mounted at an end of the soft connection region 2, and has multiple soft rubber bristles 41 distributed thereon; an annular discarding groove 5 is set up between the handle 3 and the stick body 1; and an anti-slip thread 6 is set up on the end of the stick body 1 is adjacent to the soft connection region 2. The soft connection region 2 includes an integrally-formed columnar portion and a tapered portion, where the columnar portion is connected to one end of the stick body 1, and an end of the tapered portion is connected to the bristle head 4; and the diameter of the columnar portion is smaller than that of the stick body 1. The end of the tapered portion of the soft connection region 2 is covered with the bristle head 4, and is processed by injection molding. The lengths of the multiple flexible rubber bristles 41 are different, and the multiple flexible rubber bristles 41 of different lengths are evenly distributed on the outer surface of the bristle head 4.

Further preferably, the bristle head 4 is made of a silicone material. The anti-slip thread 6 is an annular external thread structure. The stick body 1 has a cylindrical structure.

The present invention adopts an injection molding production process in which a double stack mold structure and feed drums independent from each other are adopted. During the injection molding, the stick body 1 is first produced from a PP material, then the mold is inverted to conduct feeding from a silicone cartridge, and the injection molding of the bristle head 4 is completed at the head of the stick body 1. Such a production process does not require secondary processing, which not only saves time, but also increases the production efficiency, and the key is that the pollution caused by the secondary processing is eliminated. The product dimension, the bristle head size, the density, and the amount of bristles of the bristle head of the injection-molded applicator stick are not changed as compared with those of the electrostatic flocking and flocking by other processes.

The material adopted for the stick body of the present invention is PP, which is poisonless, tasteless and of good strength. The portion of the head for sticking the drug is made of a silicone material, such that the portion is soft, provides the patient with a comfortable sense without any foreign body sensation when applied on an afflicted part, and can extend to a small site of the afflicted part to enable the drug to be applied more thoroughly; the portion is corrosion-resistant, can stick to various medicines required for tooth treatment, will not lose bristles, and is safe and hygienic; the bristle head 4 has a large density, an uniform amount and density of the bristles, a good adsorbability, sticks the drug without any residue, and can stick an appropriate dosage as desired and thus does not result in waste.

The discarding groove 5 of the present invention is a concave annular structure which, after use, can be broken therefrom to separate the handle 3 from the stick body 1 for use as a sign of having been used. The stretch of the distance from the connection between the soft connection region 2 and the stick body 1 to the bristle head 4 can be bent at any angle, and thus is suitable for drug application at different angles, different afflicted parts and narrow spaces. The bristle head 4 is made of a silicone material, which is soft and corrosion-resistant, has a large density, a good adsorbability, a uniform application, and can extend to a narrow afflicted part to make the treatment more in place. The stick body 1 is made of a PP material, which is poisonless, tasteless and of good strength. Compared with the prior art, in terms of the electrostatic flocking and flocking by other processes, the product dimension, the bristle head size, the density, and the amount of bristles cannot be consistent, and the texture is harder and the comfort of use is not enough. Moreover, the bristle head of the injection-molded applicator stick according to the present invention has no changes in the product dimension, the bristle head size, the density, and the amount of bristles, and has a soft and comfortable texture.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. An integrally-formed flexible rubber applicator stick, comprising:
   a stick body, wherein:
      the stick body is connected to a soft connection region at one end thereof and connected to a handle at an other end thereof, where the stick body is made of a polypropylene material;
   a bristle head, having a cylindrical shape, is mounted at an end of the soft connection region, and has multiple soft flexible rubber bristles distributed thereon, where the bristle head is made of a silicone material, lengths of the multiple soft flexible rubber bristles are different, and where the multiple soft flexible rubber bristles of different lengths are evenly distributed on an outer surface of the bristle head;
   an annular discarding groove is set up between the handle and the stick body;
   an anti-slip thread is set up on the end of the stick body that is adjacent to the soft connection region, where the anti-slip thread is an annular external thread structure;
   the soft connection region comprises an integrally-formed columnar portion and a tapered portion, wherein the columnar portion is connected to one end of the stick body, and an end of the tapered portion is connected to the bristle head; and the diameter of the columnar portion is smaller than that of the stick body;

an area from the connection between the soft connection region and the stick body to the bristle head is bendable at any angle; and the integrally-formed flexible rubber applicator stick is prepared by an injection molding production process in which a double injection mold structure is adopted.

2. The integrally-formed flexible rubber applicator stick according to claim 1, wherein the end of the tapered portion of the soft connection region is covered with the bristle head, and the periphery of the bristle head is covered with the flexible rubber bristles.

3. The integrally-formed flexible rubber applicator stick according to claim 1, wherein the stick body is a cylindrical structure.

\* \* \* \* \*